May 6, 1969   V. M. BERGER ET AL   3,443,063
FOOD HEATING AND CONDITIONING DEVICE
Filed Feb. 27, 1967

INVENTORS
VICTOR M. BERGER
BY JOHN L. McDONNELL
Amster & Rothstein
ATTORNEYS

United States Patent Office 3,443,063
Patented May 6, 1969

3,443,063
FOOD HEATING AND CONDITIONING DEVICE
Victor M. Berger, Bayside, and John L. McDonnell, New Rochelle, N.Y., assignors to Harvic Manufacturing Corp., New York, N.Y., a corporation of New York
Filed Feb. 27, 1967, Ser. No. 618,755
Int. Cl. F27d 11/00
U.S. Cl. 219—415                 5 Claims

ABSTRACT OF THE DISCLOSURE

A food heating and conditioning device wherein the food-holding container is suspended into the hollow interior of the device to within close proximity of an electric heating coil and a pair of asbestos panels, defining a convection air flow chamber therebetween, is located between the coil and the container and protects the latter against intense radiation as might scorch the food while also being effective to produce a continuous convection air flow to maintain the food in a heated condition.

---

The present invention relates generally to food warming devices, intended primarily for restaurant use, and more particularly to improvements in a device for maintaining foods at a predetermined, uniform heated condition. This is obtained without stirring or moving the food about to achieve an even exposure to the heat source and under circumstances minimizing burning of the food despite even prolonged periods of heating.

There is an obvious need for a food warming device capable of maintaining foods at uniform temperature, even over prolonged periods of time, which further does not require continuous supervision and which minimizes the possibility of burning of the food. To achieve adequate heat transfer uniformly throughout the body of a thick soup for example, it is necessary with presently known food warmers to continuously stir the soup to bring all portions in contact with the bottom of the soup container located, in most models, near the heat source and thus receiving the most intense radiation of the heat source. Although stirring can be minimized by operating the heat source at a comparatively high temperature, this solution contributes to burning of the food in that area adjacent to the container bottom or whatever container area is subjected to the most intense radiation of the heat source. Known prior art food warmers do not satisfactorily solve this dilemma but instead are designed only to avoid its harsh consequences. Thus, prior art models which operate with a comparatively intense heat source usually include elaborate thermostats or other temperature-limiting controls to minimize burning. At the other extreme, other prior art models which are designed to operate with a relatively low temperature heat source are provided with instructions that they will not function as intended unless there is continuous stirring of the food in order to bring the food up to and maintained at an adequate uniform temperature.

Broadly, it is an object of the present invention to provide a food warming and conditioning device overcoming the foregoing and other shortcomings of the prior art. Specifically, it is an object to provide a food warming and conditioning device utilizing convection air flow as a heat source to effectively provide an adequate uniform temperature throughout the food and in which the continuous movement of the air body which provides the heat transfer to the food inherently minimizes the possibility of burning of the food. That is, direct radiation of a stationary heating member to heat up the food is avoided as the primary heat source and instead heating of the food is achieved primarily by a continuously moving body of heated air which has considerably less tendency to produce localized hot spots and otherwise result in burning of the food.

A device for maintaining foods at a predetermined heated condition demonstrating objects and advantages of the present invention includes an outer housing forming an internal chamber and having one or more food containers in an operative position suspended into the internal chamber. A heat-baffle structure is appropriately supported within the internal chamber in a clearance position about the food container thus defining an air-heating chamber adjacent the container bottom and air flow passages adjacent the vertical sides of the container. A heating coil and associated heat insulating material are so arranged in the air-heating chamber that the container bottom is protected from intense radiation of the heating coil and instead is heated by a considerably lower temperature heat source which therefore does not result in the burning of the food located adjacent to the container bottom. However, the heating capability of the heating coil is not wasted in that it heats a continuously moving body of air which circulates from the air-heating chamber up through the vertical air flow passages adjacent the vertical sides of the food container and thus by heat transfer sufficiently heats the food in the food container adjacent these areas. The flow pattern of heated air, as just noted, results automatically from the fuctioning of the device hereof and without the use of fans or like equipment, all as will be described in detail herein.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
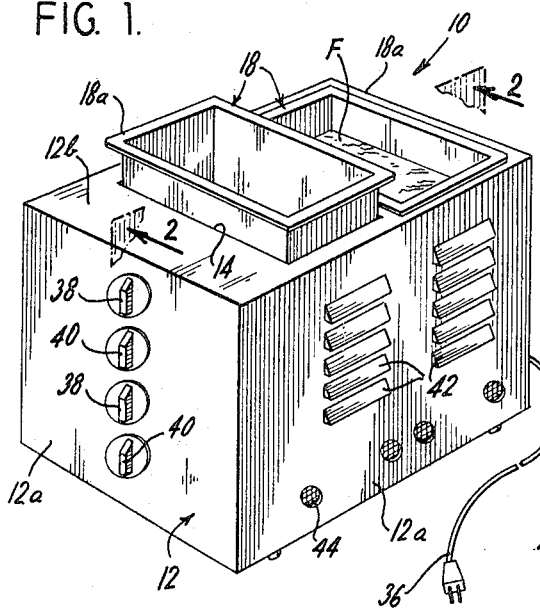
FIG. 1 is a perspective view of a food warming device according to the present invention.

Attention is directed to the drawings wherein there is shown a feed warming device, generally designated 10, demonstrating objects and advantages of the present invention. The device 10 includes an outer housing 12 formed with four vertically oriented side walls 12a and an upper horizontally oriented wall or top 12b having two openings 14 opening into an internal chamber 16 enclosed by the outer housing 12. Food containers 18 having a laterally extending lip 18a about the opening into a food storage space are, in practice, disposed in each of the openings 14 so that each container 18 occupies an operative position suspended into the internal chamber 16. A food F, such as a thick soup, chili con carne, and the like, is stored within the food container 18 and is maintained at an appropriately heated condition facilitating serving of the food F to patrons of a restaurant using the device 10. An essential feature of device 10 is that during use, it is not necessary to continually stir the food F, particularly the portion resting against or located adjacent the liquid body thereof, but that this uniform temperature results automatically from the functioning of the device 10. Additionally, the possibility of burning the food F, particularly the prtion resting against or located adjacent the container bottom 18b, is nil for all practical purposes due to the improved functioning of the device 10. Specifically, this is due to the fact that the food F in the area adjacent to the container bottom 18b is heated by controlled radiation of a heating element and in other areas, such as the sides 18c, is heated by convection air flow.

Figure 3:
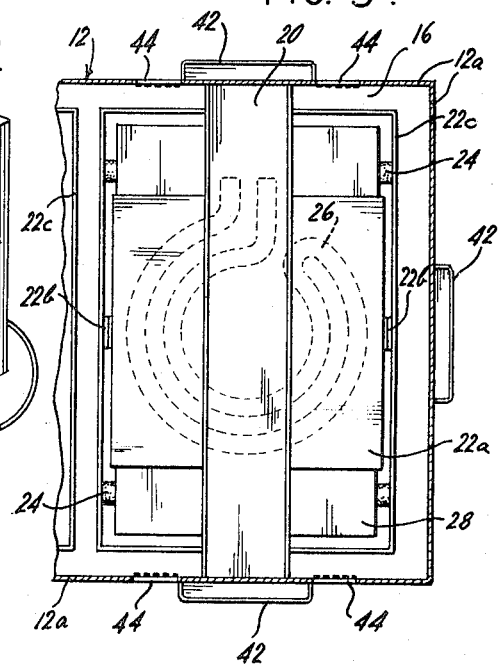
FIG. 3 is a partial plan view taken on line 3—3 of FIG. 2 as seen in the direction of the arrows, illustrating still further structural features.
Figure 2:
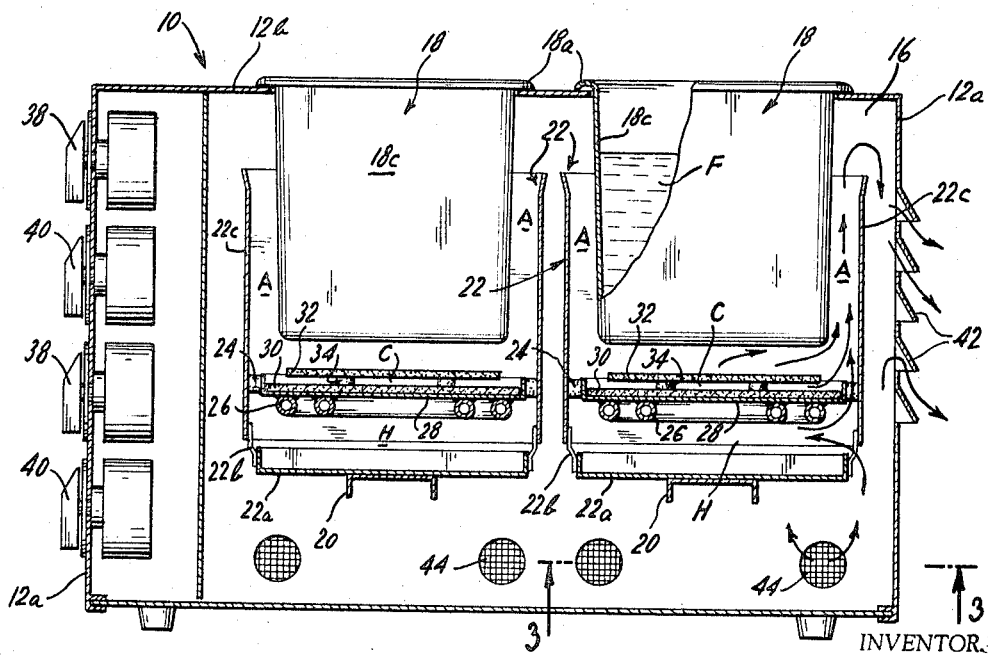
FIG. 2 is an elevational view, on an enlarged scale taken in section on line 2—2 of FIG. 1, illustrating internal structural features of the device.

As may best be understood from FIGS. 2 and 3, beneath each suspended food container 18 there is a transversely oriented support 20 connected at its opposite ends, in any appropriate manner, to opposing sides 12a of the housing 12. Each support 20 has secured thereto and supports a heat-baffle structure, generally designated 22, having a clearance position about the food container 18. This clearance position provides vertical air flow passages A in the location adjacent the container vertical sides 18c and an air-heating chamber H in the area immediately above the support 20 and beneath the container bottom 18b. More particularly, the heat-baffle structure 22 includes a bottom panel 22a having mounting members 22b appropriately secured, as by welding at the several points illustrated, to the bottom panel 22a and, in turn, supporting an open-ended structure consisting of four vertically oriented walls 22c.

An essential feature of the device 10 is a combined heating and wall structure which cooperates with the previously noted bottom panel 22a to define the opposite sides of the previously noted air-heating chamber H. This structure is supported on mounting members 24 mounting it to the baffle structure side walls 22c in a clearance position below the food container bottom 18b. The structure includes a conventionally operated heating coil 26 appropriately connected, as by welding, to a metal heat conducting panel 28 which evenly distributes the heat of the coil 26 to a first heat insulating panel 30 held against the panel 28 by a peripheral flange. Good results have been achieved using an asbestos composition sold under the trademark "Transite" and commercially available from Johns-Manville Corporation of New York, N.Y. A second heating insulating panel 32 of similar asbestos composition is arranged on spacing elements 34 in spaced relation to the first panel 30 so as to define therebetween a convection air flow chamber C.

The heating coil 26 is appropriately electrically connected to circuitry (not shown in FIG. 2) including a conventional electrical conductor and a plug 36 adapted to be connected to an electrical outlet for energizing the coil 26. The electrical circuitry additionally includes an identical set of controls for each heating coil 26 of each food container 18. In each set of controls, one element is a conventional on-off switch 38 appropriately mounted on a housing side 12a. The other element is an electrically operated timer 40 of conventional design which functions in a well understood manner to periodically open the circuit for the heating coil 26, during which time the heating coil is of course deenergized and the temperature thereof correspondingly decreases. During other portions of the operation of the timer 40, however, the electrical circuitry for the heating coil 26 is closed and the heating coil is therefore energized so that the temperature thereof rises. This cyclical operation of energizing and deenergizing of the heating coil 26 is effective to maintain an upper limit on the temperature attained by the heating coil. Depending on the particular food F which is being maintained at a predetermined heated condition, it is emperically determined what periods of time should be devoted to energizing and deenergizing of the heating coil 26 in order to maintain that food F at a preferred desirable heated condition. For example, chili con carne is believed best served at the recommended temperature of about 155° F. which, when achieved, is maintained by setting the timer 40 at that setting providing a 5–1 cyclical operation. That is, heating or energization of the heating coil 26 for a lengh of time which is five times the period of deenergization per unit of time.

The uniform heating of the food F and the ability to achieve this uniform heating without burning the food F is, however, attributable directly to the functioning of the device 10 wherein it provides heating by controlled radiation of the container bottom 18b and heating of other portions of the container 18 by heat transfer from heated air having a desirable flow path past the container 18 due entirely to convection air flow. This convection air flow occurs automatically during the operation of device 10 without the need of any fans or similar devices to force this desirable air flow pattern, all as may be best understood from the following description of the functioning of the device 10. The conventional heating coil 26 is easily and quickly brought to a comparatively high temperature in a well understood manner when it is electrically energized. The hot heating coil 26 achieves two important results. First, it is obviously significant in directly heating the container 18 and thus the food F stored within the container. It is, however, important that this direct heating be achieved under controlled conditions which minimizes the possibility of burning the food F. This, in turn, is the function of the first and second heat insulating panels 30, 32 which are effective in protecting the container bottom 18b against the intense heat radiation generated by the heating coil 26. The interposed position of the panels 30, 32 result in these panels being brought to an elevated temperature which necessarily is considerably less than the temperature of the heated coil 26, at which time these heated panels 30, 32 then function as a heat source heating the container bottom panel 18b by radiation, but at a temperature which does not result in scorching or burning of the food F. The second function of the heating coil 26 is to raise the temperature, and thus heat the air within the air-heating chamber H. Heated air, of course, rises and thus the heated air from the air-heating chamber H flows upwardly from the air-heating chamber H between the panel 28 and the heat-baffle structure side wall 22c into the vertical air-flow passages A. During passages through the air flow passages A there is a heat transfer from the heated air to the container side walls 22c which is effective to cause heating of the food F in the areas adjacent to these portions of the container. The air flowing through the air flow passages A eventually exits from the housing 12 through the vents 42.

From the foregoing it should be appreciated that air flow through the vertical air flow passages A is essential to efficient operation of the device 10. The air flow pattern is obtained due to the heating of the air in the air-heating chamber H and the natural propensity of heated air to rise. It is also initiated and supported by the unique functioning of the heat insulating panels 30, 32 as heat sources. It has already been noted that the heating of the panels 30, 32 enables the same to function as low temperature heat radiating sources for the container bottom 18b. Additionally, the panels 30, 32 are effective in heating the air within the air convection air flow chamber C formed in the clearance space between these panels. This air, when heated, expands laterally and flows from between the two panels directly into the air flow passages A. It has also been found that this movement of air, which occurs immediately above the opening between the peripheral flange of the plate 28 and the baffle structure side walls 22c, has the effect of causing a draft which initiates and supports the flow of heated air from the air-heating chamber H into the air flow passages A.

Completing the device 10 are air vent openings 44 spaced along the base of the housing 12 for cool air to enter into the air-heating chamber H from whence it follows the flow pattern depicted by the reference arrows of FIG. 2.

From the foregoing it should be readily appreciated that the device 10 efficiently functions to uniformly heat any food F stored with the food containers 18 without requiring the user to continually stir the liquid body. Additionally, the heat-baffle structure 22 which surrounds each food container 18 serves both to define air flow passages A for convection air flow with respect to the container and also as an effective heat barrier preventing overheating of the outer housing 12 which must be handled by the user of the device 10. A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

What is claimed:

1. A device for maintaining foods at a predetermined heated condition comprising an outer housing defining an internal chamber and including an upper wall having an opening therein, a food container including side and bottom walls fabricated of heat conducting material mounted in said opening in an operative position suspended into said internal chamber, a baffle including vertically oriented side walls and a horizontally oriented bottom wall operatively mounted within said internal chamber in a clearance position about said food container so as to define vertical air flow passages between said baffle side walls and said food container side walls and an air-heating chamber between said baffle bottom wall and said food container bottom wall, a heating means disposed within said air-heating chamber in a clearance position from said food container bottom wall, and upper and lower heat insulating panels operatively arranged to bound therebetween a convection air flow chamber within said air-heating chamber having an operative position interposed between said heating means and said food container bottom wall, said panels being of an extent coextensive with said food container bottom wall such that the edges of said panels bound exit openings of said convection air flow chamber which are in substantial alignment with said vertical air flow passages, whereby said food container is heated by controlled radiation in the area thereof coextensive with said heating means and in other areas by convection flowing air from said convection air flow chamber.

2. A device for maintaining foods at a predetermined heated condition as defined in claim 1 including a heat-conducting panel operatively arranged in physical contact on one side with said heating means and on the other side with said lower heat insulating panel so as to cause heating uniformly throughout said lower heat insulating panel.

3. A device for maintaining foods at a predetermined heated condition comprising an outer housing defining an internal chamber and including an upper wall having an opening therein, a food container including side and bottom walls fabricated of heat conducting material mounted in said opening in an operative position suspended into said internal chamber, a baffle including vertically oriented side walls and a horizontally oriented bottom wall operatively mounted within said internal chamber in a clearance position about said food container, said baffle side walls and said food container side walls cooperating to define vertical air-flow passages therebetween and said baffle bottom wall and said food container bottom wall cooperating to define therebetween an air-heating chamber, an electrically operated heating coil disposed within said air-heating chamber in a clearance position from said food container bottom wall, and upper and lower heat insulating asbestos panels operatively arranged to define a convection air flow chamber therebetween mounted within said air-heating chamber in an operative position interposed between said heating coil and said food container bottom wall, whereby said food container is heated by controlled radiation in the area thereof coextensive with said heating coil and in other areas by convection flowing air flow from said convection air flow chamber.

4. A device for maintaining foods at a predetermined heated condition as defined in claim 3 including an electric circuit for said heating coil and control means operatively arranged therein to periodically open said circuit to control the temperature of said heating coil.

5. A device for maintaining foods at a predetermined heated condition as defined in claim 4 including a heat conducting metal panel operatively arranged in physical contact on one side with said heating coil and on the other side with said lower asbestos panel so as to cause heating uniformly throughout said lower asbestos panel.

References Cited

UNITED STATES PATENTS

| 2,111,056 | 3/1938 | Sickinger | 219—415 |
| 3,056,013 | 9/1962 | Hollerith | 219—432 |

VOLODYMYR Y. MAYEWSKY, *Primary Examiner.*

H. B. GILSON, *Assistant Examiner.*

U.S. Cl. X.R.

219—400, 432